United States Patent [19]

Repella

[11] 4,155,560
[45] May 22, 1979

[54] WATER PUMP SEAL AND METHOD

[75] Inventor: James A. Repella, Gastonia, N.C.

[73] Assignee: Garlock Inc., Rochester, N.Y.

[21] Appl. No.: 854,387

[22] Filed: Nov. 23, 1977

[51] Int. Cl.² .............................................. F16J 15/32
[52] U.S. Cl. ...................................... 277/153; 277/24; 277/134; 277/208
[58] Field of Search ................. 277/58, 133, 138, 148, 277/134, 152, 153, 164, 165, 207 R, 207 A, 208, 24

[56] References Cited

U.S. PATENT DOCUMENTS

| | | | |
|---|---|---|---|
| 2,804,324 | 8/1957 | Stallings | 277/153 |
| 2,833,577 | 5/1958 | Reynolds | 277/153 X |
| 2,994,571 | 8/1961 | Peros | 277/208 X |
| 3,203,511 | 8/1965 | Long | 277/208 X |
| 3,306,223 | 2/1967 | Liebig | 277/153 X |
| 3,482,845 | 12/1969 | Bertrandi et al. | 277/134 |
| 3,534,969 | 10/1970 | Weinand | 277/134 X |
| 3,563,556 | 2/1971 | Scott | 277/153 X |
| 3,612,547 | 10/1971 | Kan | 277/58 |
| 3,621,952 | 11/1971 | Long | 277/153 X |
| 3,785,660 | 1/1974 | Bush | 277/134 |

FOREIGN PATENT DOCUMENTS

| | | | |
|---|---|---|---|
| 839651 | 5/1952 | Fed. Rep. of Germany | 277/153 |
| 1286775 | 1/1962 | France | 277/208 |
| 1455326 | 11/1971 | United Kingdom | 277/152 |

*Primary Examiner*—Robert S. Ward, Jr.
*Attorney, Agent, or Firm*—Schovee & Boston

[57] ABSTRACT

An annular shaft seal and method for sealing the shaft of a water pump used with coolants containing anti-corrosion compounds that can precipitate out as particles that can cause wear of shaft and seal. The shaft seal of this invention has a primary sealing element and a unique auxiliary sealing element. The unique auxiliary sealing element has a large lip contact width and is located axially inwardly of the primary sealing element for causing the anti-corrosion compounds to precipitate out at a location axially inwardly from the primary sealing element and over a larger than normal area thus reducing shaft wear due to lower unit loading. The seal also includes means for preventing the precipitated-out particles from reaching the shaft-contacting lip of the primary sealing element.

30 Claims, 3 Drawing Figures

WATER PUMP SEAL AND METHOD

BACKGROUND OF THE INVENTION

1. Field of the Invention

This invention relates to shaft seals and in a preferred embodiment to shaft seals for automotive-type water pumps which are used with coolants containing anticorrosion compounds that can precipitate out.

2. Description of the Prior Art

Automotive type water pumps operate with water and anti-freeze mixtures and often have anti-corrosion compounds (such as anti-rust compounds) added to the mixture. This fact, combined with high speeds and 15 to 50 psi pressures, has required expensive face seals to be used.

While the less expensive elastomeric type shaft seals can be designed to handle the temperatures, speeds and pressures, it has been found that the conditions that occur in water pump seals cause the anti-corrosion compounds to precititate out at the seal/shaft inteface causing rapid wear of the shaft and seal and thus, unacceptably early seal failure.

It is an object of the present invention to overcome these problems in the prior art use of elastomeric type shaft seals for water pumps, such as are used in the automotive field. It is another object of the present invention to provide an inexpensive seal and method for application to water pumps wherein the anti-corrosion materials or compounds are purposely precipitated out at a location separated from the lip of the primary sealing element. It is a further object of this invention to prevent such precipitated-out particles from reaching the lip of the primary sealing element. It is a still further object of this invention to provide a method and seal for sealing fluid containing particles that can cause wear.

SUMMARY OF THE INVENTION

An annular elastomeric shaft seal and method for a vehicular (for example, an automotive) type water pump comprising an elastomeric body preferably including: (1) a molded primary sealing element of a type well-known in the art with a shaft-containing lip (hereinafter referred to as the "primary lip"), pumping vanes and a garter spring, (2) a unique, elongated auxiliary sealing element extending axially inwardly from the primary sealing element and having a shaft contacting lip (hereinafter referred to as the "auxiliary lip") and additional pumping vanes and (3) preferably also including a secondary sealing element having a shaft contacting lip or dam (hereafter referred to as the "secondary lip") in-between the primary and auxiliary sealing elements. The auxiliary lip forms a seal and acts to cause corrosion prevention compounds to precipitate out at a location axially inwardly from the primary lip. The auxiliary lip has a larger area of lip contact with the shaft to spread the distribution of particles over a wider area, which along with lower unit loading, results in reduced wear of the shaft and seal. The precipitated-out compounds ae very abrasive and if present at the primary lip would soon destroy it. The action of precipitating out the anti-corrosion compounds is accomplished by the heat build-up caused by friction at the area of contact of the auxiliary lip against the shaft. The abrasive particles of the anti-corrosion compounds that precipitate out are, for the most part, held by the auxiliary lip or are returned to the cooling system by the hydrocynamic action of the pumping vanes of the auxiliary sealing element. Any abrasive particles that pass axially outwardly beyond the auxiliary lip and are not pumped back to the auxiliary lip are, in one preferred embodiment, held by a secondary lip which can pass some clean fluid or water vapor but not abrasive particles. Such clean fluid and water vapor is then sealed by the conventional primary sealing element of the seal.

BRIEF DESCRIPTION OF THE DRAWINGS

The present invention will be more fully understood by reference to the following detailed description thereof, when read in conjunction with the attached drawing, wherein like reference numerals refer to like elements and wherein.

DETAILED DESCRIPTION OF THE PREFERRED EMBODIMENTS

Figure 1:
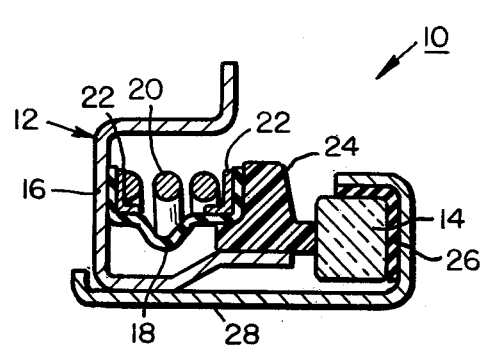
FIG. 1 is a partial cross-sectional view through a prior art expensive face seal previously required to be used with automotive type water pumps.

With reference now to the drawing, FIG. 1 shows a prior art comparatively expensive face seal for an automotive type water pump. FIG. 1 shows a face seal 10 comprising a seal assembly 12 using a helical spring preload concept and a mating ring 14, peferably constructed so as to be handled as a single unit. The unitized seal generally consists of a cartridge 16, a bellows 18, a spring 20, a ferrule or washer 22 on each end of the spring 20, a primary seal ring 24, a secondary drive seal 26, the mating ring 14, and a unitizer 28. The unitizer 28 is press fitted onto the shaft, thus the unit is not dependent upon impeller position to establish operating length. The primary seal ring 24 can be made, for example, of a filled plastic or carbon graphite and the mating ring 14 can be made, for example, of an aluminum oxide ceramic or powdered or cast metal material all of which is well-known to those skilled in the art.

Figure 2:
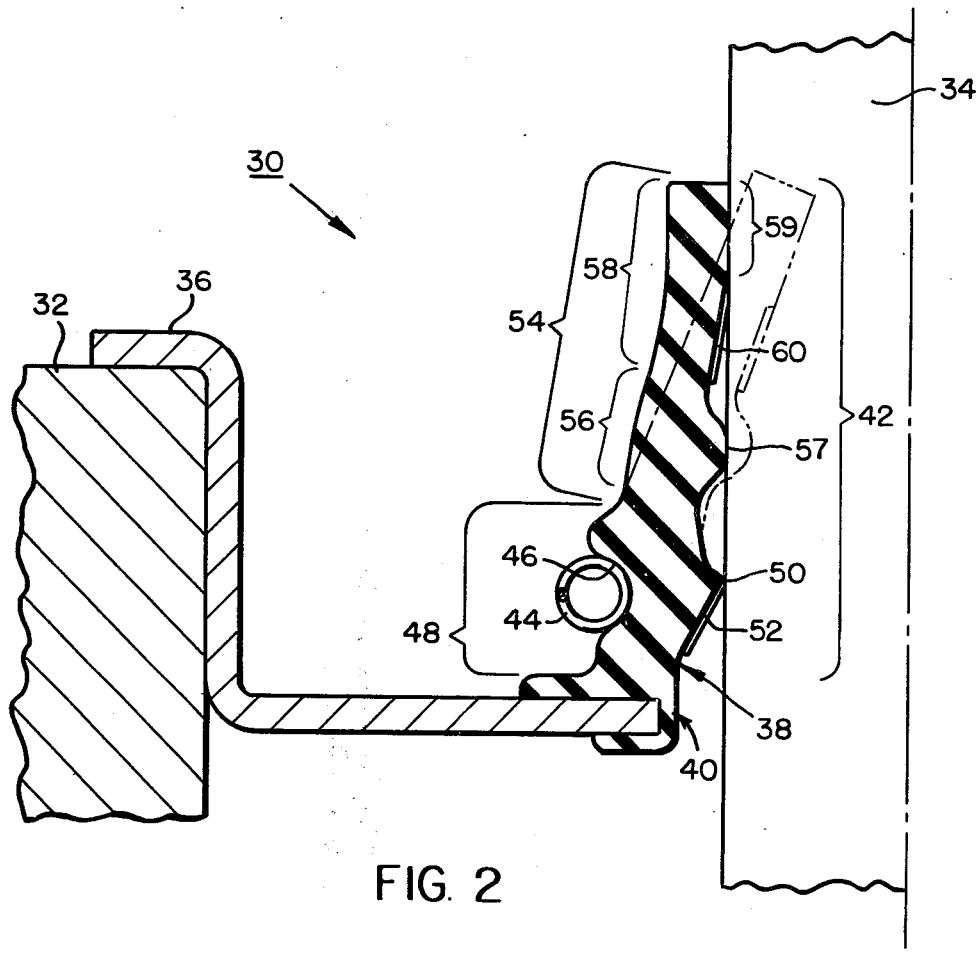
FIG. 2 is a partial cross-sectional view through the preferred embodiment of an annular elastomeric shaft seal according to the present invention.

Referring now to the pesent invention, FIG. 2 shows a preferred embodiment of an automotive type water pump shaft seal which is much less expensive than the prior art seal shown in FIG. 1 and which can carry out the same function. FIG. 2 shows an annular elastomeric shaft seal 30 for sealing against the leakage of fluid axially outwardly (i.e. in the downward direction in FIG. 2) through the annular space between the bore of a housing 32 and a shaft 34. The seal 30 includes an annular metal shell 36 and an elastomeric body 38 bonded to a radial flange of the shell 36. The elastomeric body 38 includes an anchor portion 40 and an elongated sealing portion 42. The sealing portion 42 includes a primary sealing element 48 and a unique annular extension 54. The sealing element 48 has a molded, shaft-contacting, primary lip 50, molded hydrodynamic pumping elements 52, and a garter spring 44 in a spring-retaining groove 46, as is well-know in the art. The unique annular extension 54 includes a secondary sealing element 56 having a secondary lip 57 and an elongated auxiliary sealing element 58 having an auxiliary lip 59 which has a large contact area (or width) with the shaft 34 and also having hydrodynamic pumping elements 60. The secondary lip 57 can also have hydrodynamic pumping elements. The auxiliary lip 59 has a contact area with the shaft 34 that is substantially larger (i.e., at least several times larger) than that of the primary lip 50; preferably, the contact width of the auxiliary lip 59 is between about 0.05 and 0.10 inch. The auxiliary lip 59 causes the anti-corrosion compounds to precipitate out and by doing so over a larger area of lip contact, with the lip having a lower unit loading, the particles do not destroy the auxiliary lip 59 as they would the narrower primary lip 50. The annular extension 54 is shown in FIG. 2 in phantom lines in its as-molded configuration, whereby when the seal 30 is installed in the application an interference fit is provided with the secondary lip 57 and the auxiliary lip 59 being biased into contact with the shaft 34.

In operation, the shaft seal and method of the present invention operate to prevent corrosion-prevention materials from precipitating out at the primary lip 50 and also to prevent the particles that are precipitated-out at a location axially inwardly from the primary lip 50, from coming into contact with the primary lip. Such particles precipitate out onto hot surfaces and are very abrasive and would otherwise soon destroy the primary lip. The above-mentioned operation and advantages are achieved by positioning the auxiliary lip 59 adjacent and axially inside or inwardly of the primary lip, by causing such particles to precipitate out at the auxiliary lip, and by preventing them from reaching the primary lip. The particle precipitation is caused by the heat build-up generated by friction between the auxiliary lip 59 and the shaft 34. The abrasive compounds precipitate out and the precipitated-out abrasive particles are prevented from reaching the primary lip. If any abrasive particles leak axially outwardly past the auxiliary lip, they are forced back to the auxiliary lip 59 by action of the pumping elements 60. The abrasive particles that are pumped back to the auxiliary lip 59 can pass out of the lip area back into the application or can be simply held by the auxiliary lip. Any particles that pass outwardly through the auxiliary lip 59 and are not pumped back by the pumping elements 60, are held by the secondary lip 57, which may pass some clean fluid and water vapor, but which does not pass any abrasive particles. Clean fluid or water vapor is then sealed by the conventional means of the primary lip 50 and the pumping elements 52.

Figure 3:
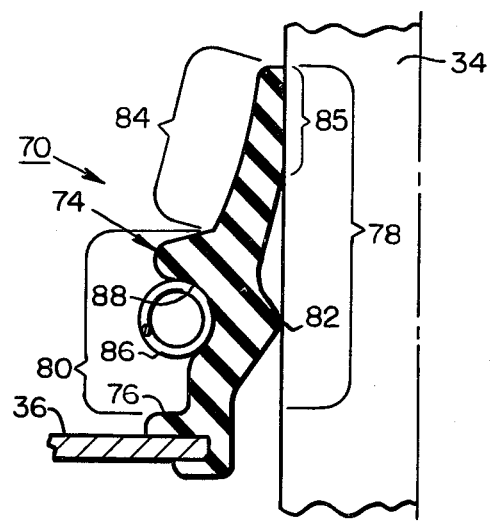
FIG. 3 is a partial cross-sectional view through another embodiment of the seal of the present invention.

FIG. 3 shows another embodiment of the present invention of an annular elastomeric shaft seal 70 including a metal shell 36 and an elastomeric body 74 bonded thereto. The elastomeric body includes an anchor portion 76 and an elongated sealing portion 78. The seal portion 78 includes a primary sealing element 80 and an integral, elongated, auxiliary sealing element 84 having an auxiliary lip 85 adapted to contact the shaft 34 over an elongated contact area. The primary sealing element 80 includes a molded primary lip 82 and a garter spring 86 in a groove 88.

The shaft contact width of the auxiliary lip (59 or 85) of the present invention is preferably between about 0.05 inch and 0.10 inch, as contrasted to between about 0.005 inch and 0.010 inch for the primary lip (50 or 82). Once the seal has been running for a short time, the auxiliary lip cntact temperature will be between 50° F. and 100° F. hotter than the anti-freeze solution being sealed. The life of just a primary sealing element without the auxiliary sealing element of this invention would be about 100 hours or less (which would be impractical for this application) in contrast to the life of the seal of the present invention which is expected to be comparable to that of existing face seals (i.e., 1000 hours or more on the test stand). Normally, the shaft speed varies between 500 and 8,000 rpm. The elastomer used in the present invention is preferably nitrile, the shaft 34 normally is made of carbon steel and has a surface finish of from 10 to 30 r.m.s.

The invention has been described in detail with particular reference to the preferred embodiments thereof, but it will be understood that variations and modifications can be effected within the spirit and scope of the invention as described hereinabove and as defined in the appended claims.

For example, the present invention is not limited to vehicular type (such as automotive) water pumps but is useful in any application for sealing fluid containing particles that can cause wear and damage to the shaft and/or seal thus destroying or limiting the life of the seal. Thus, this invention is not limited to use with pumps, is not limited to the fluid being water, is not limited to the particles being precipitated-out (the particles may simply already be present in the particular fluid) and is not limited to the fluid being a coolant.

I claim:

1. A method for sealing the annular space between a shaft of a fluid pump and a bore of the pump housing through which the shaft extends, against the flow of a fluid mixture containing a material that can precipitate out at a shaft/seal interface as particles that can cause wear, said method comprising the steps of:
   (a) mounting on said housing, an annular elastomeric shaft seal having an integral primary sealing element including a primary lip and an auxiliary sealing element including an auxiliary lip,
   (b) positioning said primary lip in sealing contact with said shaft,
   (c) positioning said auxiliary lip in sealing contact with said shaft axially inside of said primary lip and in contact with said shaft over a shaft contact area substantially larger than that of said primary lip,
   (d) precipitating out, at the shaft/seal interface of said auxiliary lip, said material as particles, and
   (e) substantially preventing said precipitated-out particles from reaching said primary lip.

2. The method according to claim 1 including providing said auxiliary lip with a shaft contact width of between about 0.05 inch and 0.10 inch.

3. The method according to claim 1 wherein said preventing step comprises holding said particles at said auxiliary lip.

4. The method according to claim 1 including pumping particle-containing fluid that passes said auxiliary lip axially inwardly back toward said auxiliary lip.

5. The method according to claim 1 including positioning an integral secondary sealing element having a secondary lip in sealing contact with said shaft and between said primary lip and said auxiliary lip for sealing against the leakage of any of said particles past said auxiliary lip to said primary lip.

6. The method according to claim 5 wherein said pump is a vehicular type water pump of the type that operates with water, anti-freeze, and anti-corrosion materials and wherein said preventing step comprises preventing precipitated-out anti-corrosion material particles from reaching said primary lip, and wherein said mounting step comprises mounting on said housing a one-piece, molded annular, elastomeric shaft seal having said integral primary and auxiliary sealing elements.

7. The method according to claim 1 wherein said pump is a vehicular type water pump of the type that operates with water, anti-freeze, and anti-corrosion materials and wherein said preventing step comprises preventing precipitated-out anti-corrosion material particles from reaching said primary lip.

8. The method according to claim 1 wherein said mounting step comprises mounting on said housing a one-piece, molded, annular, elastomeric shaft seal having said integral primary and auxiliary sealing elements.

9. An annular shaft seal for sealing the annular space between a shaft and a bore of a housing through which the shaft extends, against the flow therethrough of a fluid containing a material that can precipitate out at a shaft/seal interface as particles that can cause wear, comprising an annular elastomeric shaft seal adapted to be mounted on a housing and including an integral primary sealing element and auxiliary sealing element, said primary sealing element having a primary lip being adapted to sealingly contact a shaft and said auxiliary sealing element having an auxiliary lip also being adapted to sealingly contact the same shaft axially inside of said primary lip, and over a lip contact area substantially larger than that of said primary lip, for causing said material to precipitate out at the shaft/seal interface of said auxiliary lip, said auxiliary lip being adapted to prevent said particles from flowing to said primary lip.

10. The article according to claim 9 wherein said auxiliary lip contacts said shaft over a width of between about 0.05 and 0.10 inch.

11. The article according to claim 9 including pumping vanes on said auxiliary sealing element axially outwardly from said auxiliary lip for pumping particle-containing fluid away from said primary lip.

12. The article according to claim 9 wherein said shaft seal is a one-piece, molded member having said integral primary and auxiliary sealing elements.

13. The article according to claim 9 wherein said seal includes an integral secondary sealing element having a secondary lip adapted to sealingly contact the same shaft and located in-between said auxiliary lip and said primary lip for sealing any particles that get past said auxiliary lip and for preventing them from getting to said primary lip.

14. The article according to claim 13 wherein said primary sealing element, said secondary sealing element and said auxiliary sealing element are all integral parts of a one-piece, molded annular elastomeric body.

15. The article according to claim 14 wherein said shaft seal includes a metal reinforcing shell and a garter spring for biasing said primary lip into contact with a shaft.

16. A method for sealing the annular space between a shaft and a bore of a housing through which the shaft extends, against the flow therethrough of a fluid containing a material that can precipitate out at a seal/shaft interface as particles that can cause wear comprising:
 (a) mounting on said housing, an annular shaft seal having an integral primary sealing element having a primary lip and an auxiliary sealing element having an auxiliary lip,
 (b) positioning said primary lip in sealing contact with the shaft,
 (c) positioning said auxiliary lip in contact with said shaft axially inside of said primary lip and in contact with said shaft over a shaft contact area substantially larger than that of said primary lip,
 (d) precipitating out, at the shaft/seal interface of said auxiliary lip, said material as particles, and
 (e) substantially preventing said precipitated-out particles from reaching said primary lip.

17. The method according to claim 16 including providing said auxiliary lip with a shaft contact width of between about 0.05 and 0.10 inch.

18. The method according to claim 16 wherein said preventing step comprises holding said particles at said auxiliary lip to prevent them from flowing to said primary lip.

19. The method according to claim 16 including pumping particle-containing fluid that passes said auxiliary lip axially inwardly back toward said auxiliary lip.

20. The method according to claim 16 including positioning an integral secondary sealing element having a secondary lip in sealing contact with said shaft between said primary lip and said auxiliary lip for sealing against the leakage of any of said particles past said auxiliary lip to said primary lip.

21. A method for sealing the annular space between a shaft and a bore of a housing through which the shaft extends, against the flow therethrough of a fluid containing particles that can cause wear comprising:
 (a) mounting on said housing, a one-piece, molded, elastomeric annular shaft seal having an integral primary sealing element including a primary lip and an auxiliary sealing element including an auxiliary lip,
 (b) positioning said primary lip in sealing contact with said shaft, and (c) positioning said auxiliary lip in contact with said shaft axially inside of said primary lip and over a shaft contact area substantially larger than that of said primary lip, whereby said auxiliary lip substantially prevents said particles from reaching said primary lip.

22. The method according to claim 21 including pumping particle-containing fluid axially inwardly away from said primary lip.

23. The method according to claim 21 including contacting said auxiliary lip with said shaft over a contact width of from about 0.05 to 0.10 inch.

24. The method according to claim 21 including positioning an integral secondary lip in sealing contact with said shaft between said primary lip and said auxiliary lip for sealing against the leakage of any of said particles past said auxiliary lip to said primary lip.

25. An annular shaft seal for sealing the annular space between a shaft and a bore of a housing through which the shaft extends, against the flow therethrough of a fluid containing particles which can cause wear to a shaft and seal comprising:
 (a) a one-piece, annular, molded, elastomeric shaft seal including an integral primary sealing element having a primary lip and auxiliary sealing element having an auxiliary lip, and
 (b) said primary lip being adapted to contact a shaft and said auxiliary lip being adapted to contact the same shaft axially inside of said primary lip and over a shaft contact area substantially larger than that of said primary lip, for preventing said particles from reaching said primary lip.

26. The article according to claim 25 wherein said auxiliary lip has a shaft-contacting width between about 0.05 and 0.10 inch.

27. The article according to claim 25 including pumping vanes on said auxiliary sealing element axially outwardly from said auxiliary lip for pumping particle-containing fluid away from said primary lip.

28. The article according to claim 25 including an integral secondary sealing element having a secondary lip adapted to sealingly contact the same shaft and being located in-between said auxiliary lip and said primary lip for preventing any particles that get past said auxiliary lip from getting to said primary lip.

29. A vehicular water pump for pumping a fluid mixture containing a material that can precipitate out at a shaft/seal interface as particles that can cause wear to a shaft and seal including:
  (a) a pump housing having a bore,
  (b) a shaft extending through said bore, and
  (c) an annular shaft seal for sealing the annular space between said shaft and bore, said seal comprising:
    (i) an annular, one-piece, molded elastomeric shaft seal having an integral primary sealing element including a primary lip and auxiliary sealing element including an auxiliary lip, and
    (ii) said primary lip being in sealing contact with said shaft, and said auxiliary lip also being in sealing contact with said shaft at a location axially inside of said primary lip and having a shaft-contact area substantially larger than that of said primary lip for precipitating out said particles and for preventing said precipitated-out particles from reaching said primary lip.

30. The apparatus according to claim 29 wherein said seal includes a metal shell press-fitted in said housing bore.

* * * * *